[12] United States Patent  
Rumph et al.

(10) Patent No.: US 8,763,769 B2  
(45) Date of Patent: Jul. 1, 2014

(54) BRAKE SHOE WITH MULTI-FUNCTION METAL INSERT

(75) Inventors: Timothy A. Rumph, Laurinburg, NC (US); Bruce W. Shute, West End, NC (US); Martin Petzoldt, Whispering Pines, NC (US)

(73) Assignee: RFPC Holding Corp., Wilmerding, PA (US)

( * ) Notice: Subject to any disclaimer, the term of this patent is extended or adjusted under 35 U.S.C. 154(b) by 134 days.

(21) Appl. No.: 13/056,008

(22) PCT Filed: Aug. 6, 2009

(86) PCT No.: PCT/US2009/052953  
§ 371 (c)(1),  
(2), (4) Date: Jan. 26, 2011

(87) PCT Pub. No.: WO2010/019438  
PCT Pub. Date: Feb. 18, 2010

(65) Prior Publication Data  
US 2011/0132705 A1  Jun. 9, 2011

Related U.S. Application Data

(60) Provisional application No. 61/088,135, filed on Aug. 12, 2008.

(51) Int. Cl.  
*F16D 13/36* (2006.01)

(52) U.S. Cl.  
USPC .................. 188/248; 188/252; 188/250 B

(58) Field of Classification Search  
None  
See application file for complete search history.

(56) References Cited

U.S. PATENT DOCUMENTS

| | | | |
|---|---|---|---|
| 695,248 A * | 3/1902 | Streeter | 188/251 R |
| 909,015 A * | 1/1909 | Norman | 188/252 |
| 918,605 A * | 4/1909 | Stark | 188/252 |
| 1,025,219 A * | 5/1912 | Thompson | 188/248 |
| 1,872,850 A * | 8/1932 | Trainer | 188/258 |
| 2,835,356 A * | 5/1958 | Wilson | 188/252 |
| 2,885,037 A * | 5/1959 | Wilson | 188/251 R |
| 2,911,074 A * | 11/1959 | Fraula et al. | 188/251 A |
| 2,948,361 A | 8/1960 | Pogue | |
| 4,020,928 A | 5/1977 | Beetle | |
| 4,181,202 A | 1/1980 | Trajtenberg et al. | |
| 6,241,058 B1 * | 6/2001 | Shute et al. | 188/250 B |
| 8,267,229 B2 * | 9/2012 | Kahr et al. | 188/251 R |
| 8,365,884 B2 * | 2/2013 | Kahr et al. | 188/248 |
| 2002/0108824 A1 * | 8/2002 | Shute et al. | 188/252 |
| 2003/0234142 A1 * | 12/2003 | Shute et al. | 188/250 B |
| 2009/0127037 A1 * | 5/2009 | Kahr et al. | 188/250 B |
| 2010/0224453 A1 * | 9/2010 | Kahr et al. | 188/251 R |

FOREIGN PATENT DOCUMENTS

WO  WO 2008150286 A1 * 12/2008 ............. F16D 65/06

* cited by examiner

*Primary Examiner* — Thomas Irvin  
(74) *Attorney, Agent, or Firm* — The Webb Law Firm

(57) ABSTRACT

The invention is directed to an insert for a backing plate assembly for a composition friction brake shoe. The insert is particularly useful in the formation of a universal brake shoe for use with a trolley car braking system. The insert includes a central member having a first and second set of attachment posts extending from the respective ends thereof. These first and second sets of attachment posts are adapted for securing a first and second backing plate strap, respectively, thereto. A key bridge extends through a back portion of the central member and is configured for attachment to a brake shoe. A flange guide support extends from a side portion of the insert and includes legs defining a channel that runs parallel to the insert. The flange guide support is adapted for contacting a wheel flange to align a brake shoe with the wheel during braking of the vehicle.

19 Claims, 5 Drawing Sheets

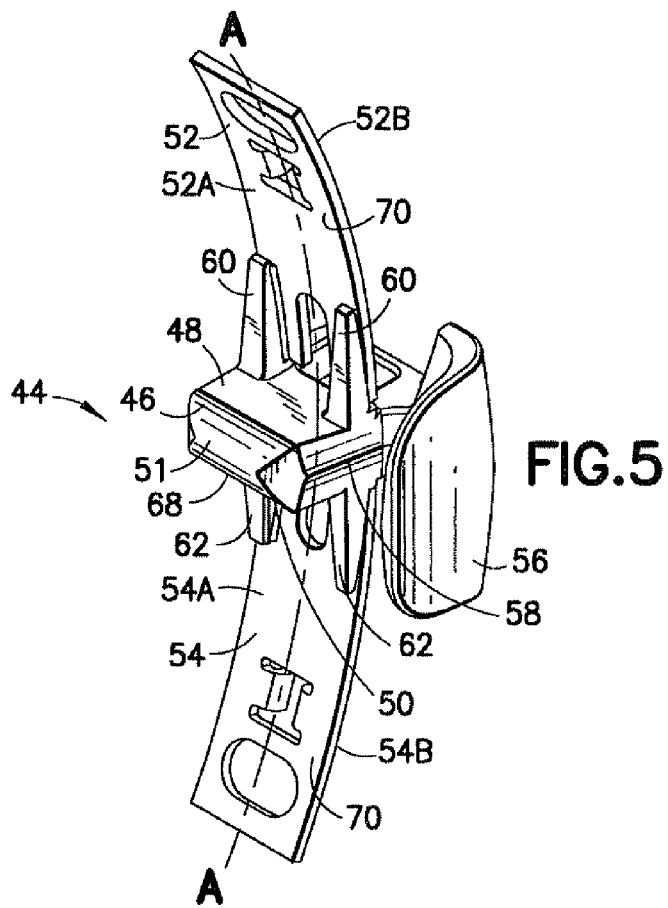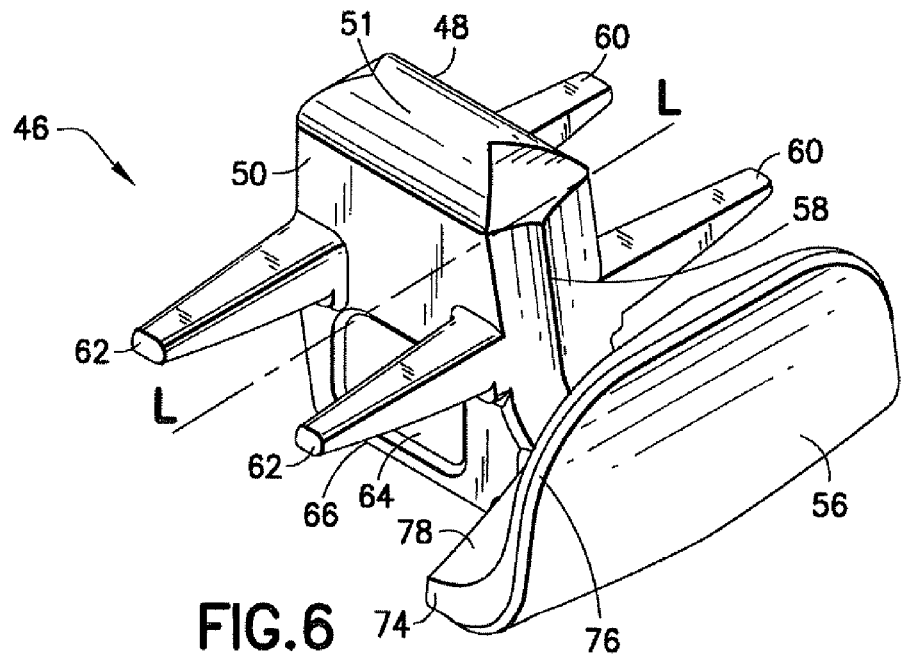

BRAKE SHOE WITH MULTI-FUNCTION METAL INSERT

CROSS-REFERENCE TO RELATED APPLICATIONS

This application is based on and claims priority to Provisional Patent Application No. 61/088,135, entitled "Brake Shoe With Multi-Function Metal Insert", filed Aug. 12, 2008, which is hereby incorporated by reference in its entirety.

BACKGROUND OF THE INVENTION

1. Field of the Invention

The present invention relates, in general, to a backing plate for a brake shoe for use in a trolley car braking system and, more particularly, to a multi-functional metal insert for use with a backing plate assembly in the formation of composite brake shoes for use in trolley car braking systems.

2. Description of Related Art

Milan type trolley cars, which are mass-transportation systems common in several cities, such as San Francisco, Calif., currently use cast-iron brake shoes in their braking systems. Examples of these types of brake shoes, generally indicated as 10, are shown in FIGS. 1A and 1B. These brake shoes include a U-shaped groove 12 that is used to help align the brake shoes against the vehicle's wheel (not shown) during braking by guiding the brake shoe flanges 14, 16, located at the outer ends of the brake shoe 10 against the wheel flange. The friction surface 18 which contacts the wheel is typically thicker at one end 20 than at an opposite end 22 thereof. Due to the non-symmetrical shape and thickness of this type brake shoe; i.e., wherein flange 14 is larger in size than flange 16 and differing thicknesses 20, 22 of the friction material, proper installation thereof requires a right hand and a left hand shoe. Presently, a mechanic performing the installation is relied upon to properly orient the brake shoes during installation in the vehicle.

Additionally, since these brake shoes are produced from cast iron material, as the brakes are applied, cast iron wear particles and dust contaminate the city streets where the trolley cars operate. Presently, considerable expense is incurred to periodically clean the cast iron residue from the city streets.

As shown in FIG. 2, composition friction material brake shoes, generally illustrated as 25, have been produced using metal backing plates 26. These types of brake shoes include a pair of side flanges 28, 29, located at opposite ends of the brake shoe 25, for alignment with the wheel flange (not shown) during braking to bring the composition friction material 30 into contact with the wheel surface (not shown).

FIG. 3 shows an example of the backing plate, generally indicated as 26, which may be used in the composition brake shoe 25 of FIG. 2. The backing plate includes the pair of U-shaped side flanges 28, 29. A metal insert 32 may be separately welded to a front surface 33 of the backing plate 26. A key bridge 34, which facilitates attachment of the brake shoe 25 to a brake head, may be separately welded onto a back surface 35 of the backing plate 26. U.S. Pat. No. 6,241,058 to Shute et al. shows another example of a brake shoe suitable for use in a railway vehicle. This type of brake shoe includes a backing plate having a first friction type composition material bonded to the backing plate and at least one discrete insert formed of a second friction type material molded into the first friction type material. These types of brake shoes include multiple processing/molding steps.

SUMMARY OF THE INVENTION

According to a first aspect of the invention, there is provided a backing plate configured for use with a brake shoe, such as for a trolley car braking system. The backing plate includes an insert having a first end, a second end, and a central portion extending between the first end and the second end. A first backing plate strap is associated with the first end of the insert and a second backing plate strap is associated with the second end of the insert. A flange guide support extends from a side of the central portion of the insert. According to one embodiment, the insert includes a first set of attachment posts extending from the first end and a second set of attachment posts extending from the second end. The first and second backing plate straps are secured to these first and second sets of attachment posts, respectively. This securement can be achieved by welding, brazing, fusing and the like. The central portion of the insert includes a key bridge extending through an outwardly extending back portion thereof. This key bridge is configured for attachment to a vehicle brake head. The first and second backing plate straps are curved to form an arc and the central portion of the insert includes a front portion extending in an outward direction with respect to the arc defined by the first and second backing plate straps. The first and second backing plate straps and the front portion of the insert define a front face. This front face is adapted for attachment with a composition friction material. The first backing plate strap, the second backing plate strap and the insert define a support member for supporting the composition friction material. The composition friction material can be attached to the backing plate by any known method including molding or the use of a separate adhesive. The flange guide support includes a pair of legs that cooperate with the central portion of the insert to form a U-shaped member defining a channel. This U-shaped member is configured for contacting a wheel flange and aligning a center portion of the brake shoe against a vehicle wheel during braking. The first backing plate strap, the second backing plate strap, and the insert are preferably formed from metal, but can be formed from any other well-known material including composite and plastic materials.

According to another aspect of the invention, there is provided an insert for use in a backing plate assembly for a brake shoe. The insert includes a central member having a first end, a second end and side portions extending between the first and second ends. At least a first attachment post extends from the first end and at least a second attachment post extends from the second end. Preferably the at least first attachment post and the at least second attachment post comprise a first and second set of attachment posts. These first and second sets of attachment posts are adapted for securing a first and second backing plate strap, respectively, thereto. A key bridge extends through a back portion of the central member and is configured for attachment to a vehicle brake head. A flange guide support extends from one of the side portions. This flange guide support cooperates with the side portion of the central member to form a U-shaped member defining a channel that runs parallel to the insert. The U-shaped member is adapted for contacting a wheel flange to align a brake shoe with the wheel during braking of the vehicle. The central portion, the first and second set of attachment posts and the flange member are preferably formed from metal but can also be formed by other well-known materials.

According to yet another aspect of the invention there is provided a universal brake shoe for use with a trolley car braking system. The brake shoe includes a backing plate having a front face and a back face. The backing plate includes a pair of backing plate straps joined with an insert member. The insert member includes a key bridge extending through a back portion thereof which is adapted for attachment with a brake head. A friction material is associated with the front face of the backing plate. This friction material is adapted for contacting a vehicle wheel during braking. The insert member can include a flange guide support extending from a side portion thereof. This flange guide support is adapted for contacting a wheel flange and aligning a center portion of the brake shoe against the vehicle wheel during braking. The friction material has a substantially uniform thickness and is substantially symmetrical in shape such that the brake shoe is adapted for use on either a right hand or left hand side of the vehicle. In one embodiment, the backing plate is formed from a metal material and the friction material is formed from a composition friction material.

The composition brake shoe design of the present invention reduces the amount of cast iron metal residue contaminating the city streets to a level that should not require special cleaning. The inventive brake shoe also utilizes a symmetrical shape and a uniform thickness of friction material resulting in a single brake shoe design which can be installed at all locations of the vehicle. Further still, the brake shoe design of the invention has a flange guide located at a central portion of the shoe, as opposed to the ends of the shoe, which reduces the tooling cost required to produce the brake shoe, allowing for a replacement composition brake shoe to be produced at a competitive price.

These and other features and characteristics of the present invention, as well as the methods of operation and functions of the related elements of structures and the combination of parts and economies of manufacture, will become more apparent upon consideration of the following description with reference to the accompanying drawings, all of which form a part of this specification wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

FIG. 5 is a front perspective view of the backing plate assembly for use with the brake shoe of FIGS. 4A and 4B;

FIG. 6 is a perspective view of a metal insert for use with the backing plate of FIG. 5.

DETAILED DESCRIPTION OF THE INVENTION

Figure 1A:
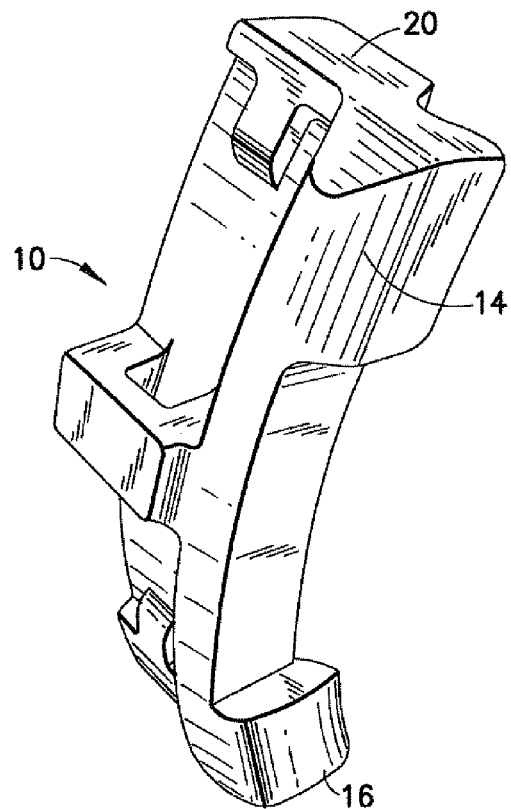
FIGS. 1A and 1B are back and front perspective views of a cast iron trolley brake shoe according to the prior art.
Figure 1B:
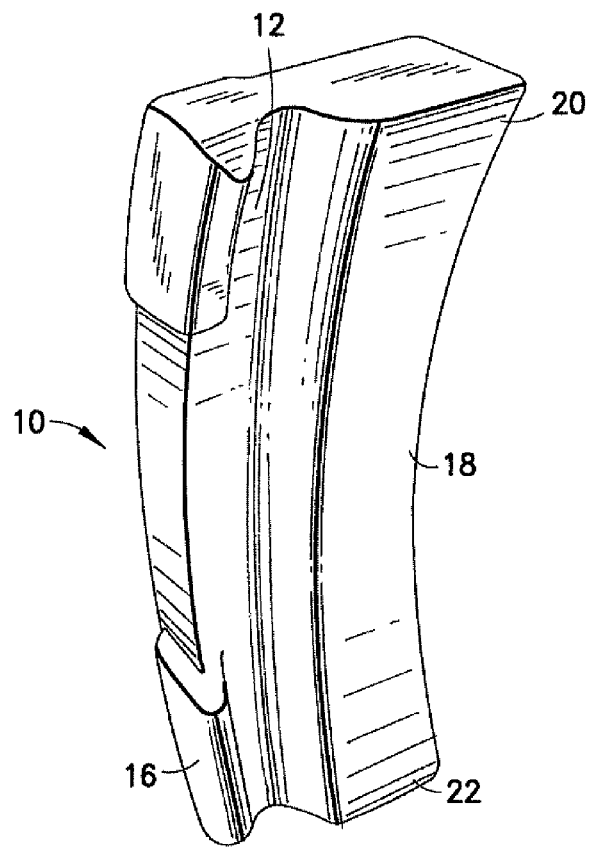
Figure 2:
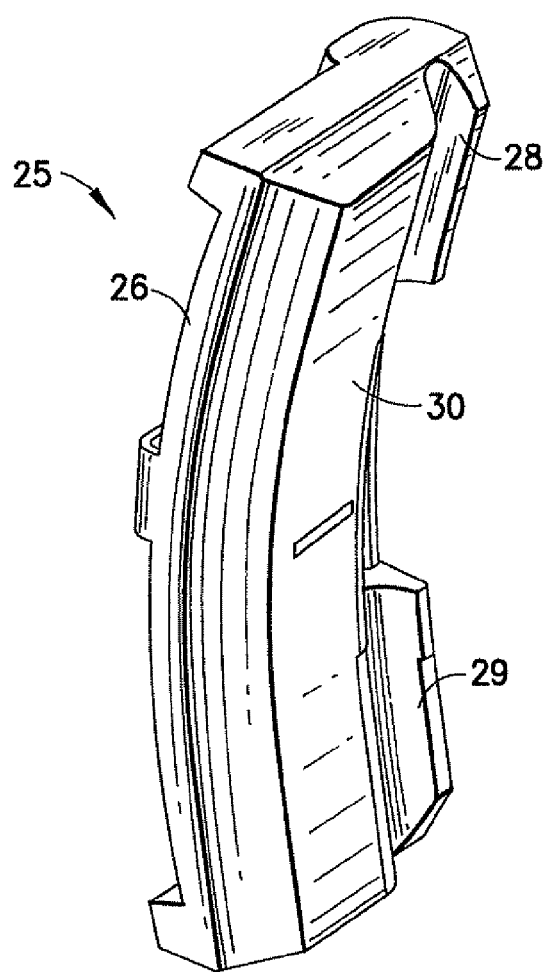
FIG. 2 is a perspective side view of a flanged composition brake shoe according to the prior art.
Figure 3:
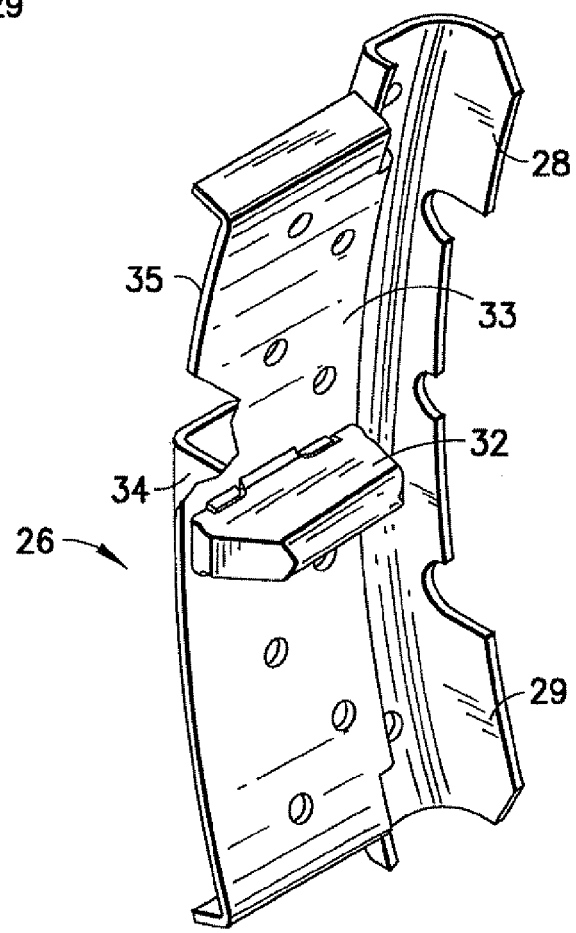
FIG. 3 is a perspective side view of a backing plate of the prior art which may be used in the composition brake shoe of FIG. 2.

For purposes of the description hereinafter, spatial or directional terms shall relate to the invention as it is oriented in the drawing figures. However, it is to be understood that the invention may assume various alternative variations, except where expressly specified to the contrary. It is also to be understood that the specific components illustrated in the attached drawings, and described in the following specification, are simply exemplary embodiments of the invention. Hence, specific dimensions and other physical characteristics related to the embodiments disclosed herein are not to be considered as limiting.

The present invention can be characterized as a relocation of the flange guide portion of the brake shoe design which allows for the simplification of tooling and a combination of design features when producing the backing plate assembly. By relocating the flange guiding portion of the brake shoe to the center of the brake shoe instead of at the ends of the shoe, a simplified backing plate assembly design can be used. The support for the centrally located flange guide features can be produced as part of a multi-functional insert design, instead of as part of the metal strap design, eliminating the need for complex tooling otherwise required to make the parts.

Figure 4A:
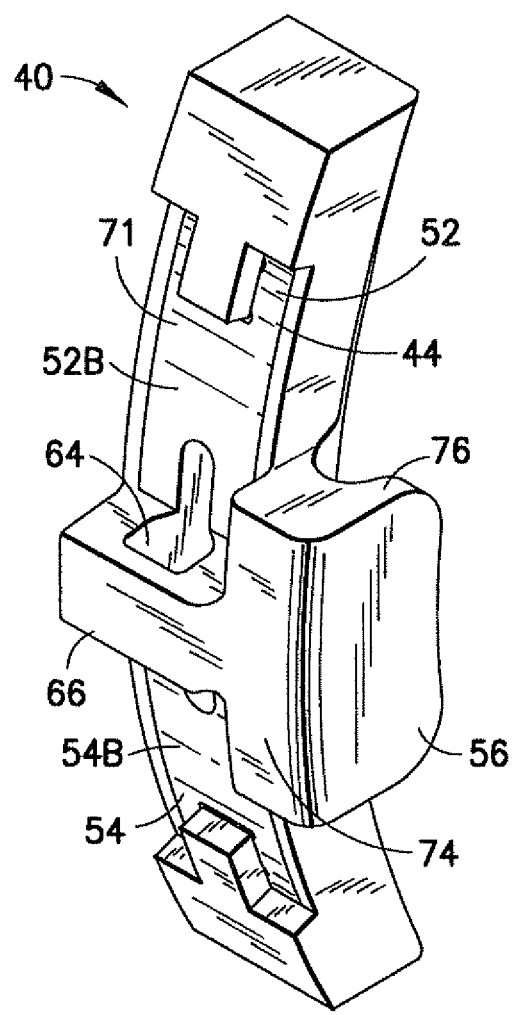
FIG. 4A is a rear perspective view of the universal trolley car brake shoe illustrating the particulars of the backing plate of the present invention.
Figure 4B:
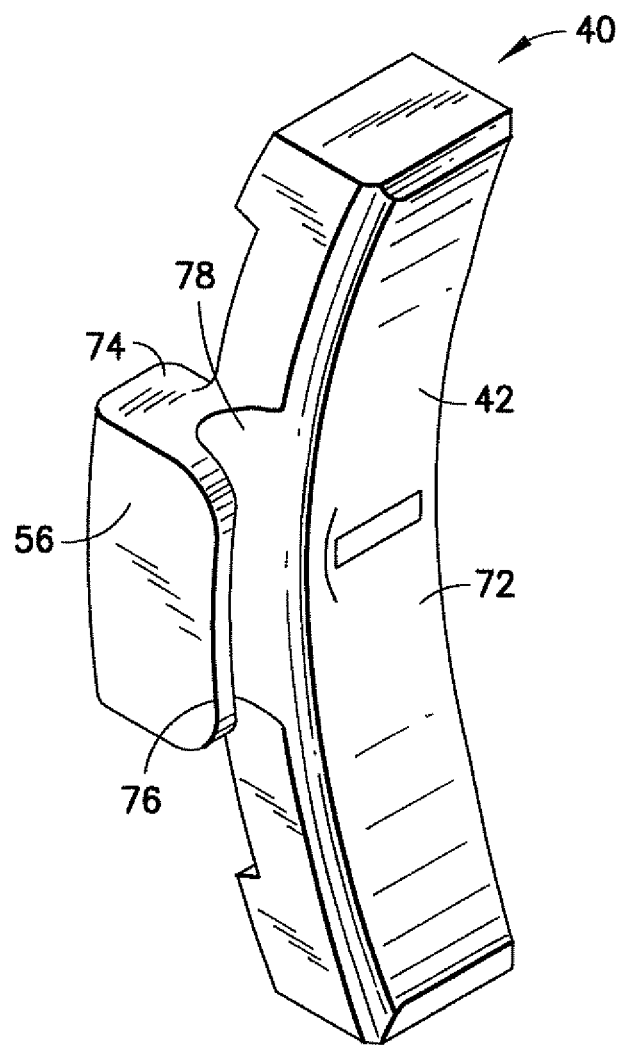
FIG. 4B is a front perspective view of the universal trolley car brake shoe of the present invention.
Figure 7:
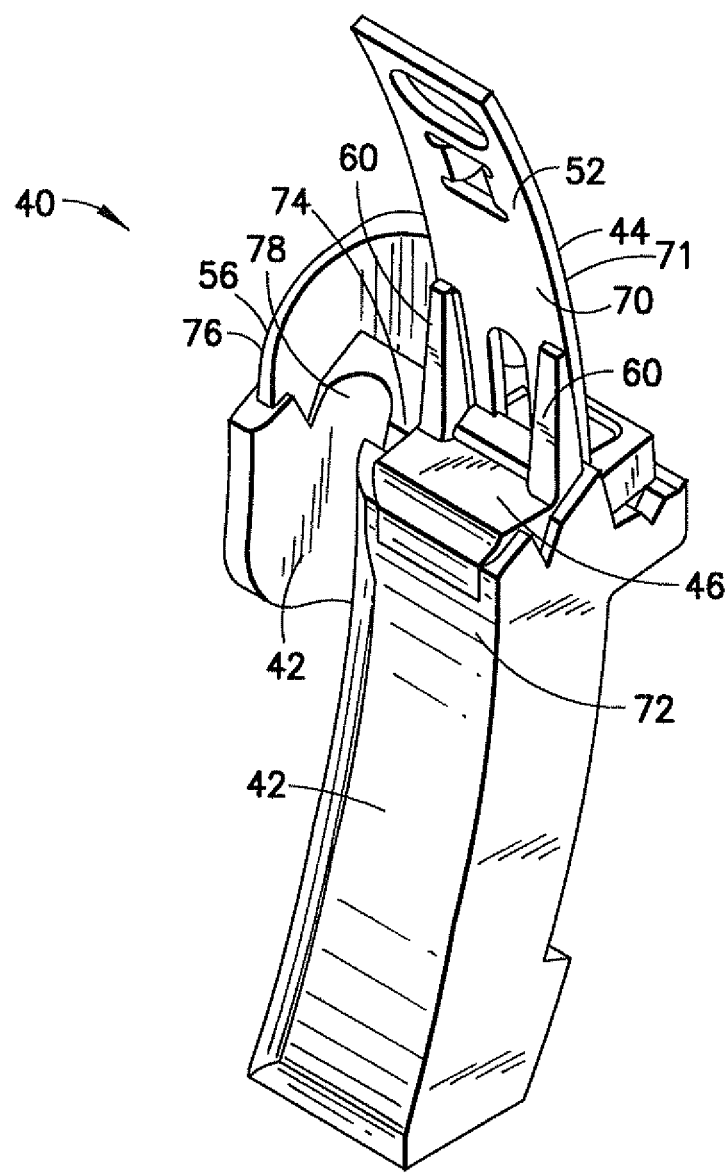
FIG. 7 is a front perspective view of the universal trolley car brake shoe illustrating the interaction of the backing plate with the composition friction material.

Reference is now made to FIGS. 4A, 4B and 7 which show perspective views of a universal brake shoe, generally illustrated as 40, for use with a trolley car braking system (not shown). The universal brake shoe 40 has a symmetrical size and shape such that it is adapted for use on either a right hand or left hand side of the vehicle. The universal brake shoe 40 includes a friction material 42 located on a front face thereof which is adapted to be brought into contact with a wheel surface (not shown). A backing plate 44, as discussed in more detail below, supports the friction material 42.

Reference is now made to FIG. 5, which shows the backing plate, generally indicated as 44, for use with the universal brake shoe 40 of FIGS. 4A, 4B and 7. The backing plate includes an insert 46 having a first end 48, a second end 50, and a central portion 51 extending between this first end 48 and second end 50. A first backing plate strap 52 is associated with the first end 48 of the insert 46. A second backing plate strap 54 is associated with the second end 50 of the insert 46. A flange guide support 56 is connected to and extends from a side 58 of the central portion 51 of the insert 46.

Reference is now made to FIG. 6, which shows a perspective view of the insert, generally indicated as 46, for use with the backing plate 44. The insert includes at least a first backing plate attachment post 60 extending from the first end 48 thereof. This attachment post 60 is adapted for attachment with the first backing plate strap 52. The insert also includes at least a second backing plate attachment post 62 extending from the second end 50 thereof and adapted for attachment with the second backing plate strap 54. According to one embodiment, the insert 46 includes a first set or pair of attachment posts 60 extending from the first end 48 thereof and a second set or pair of attachment posts 62 extending from the second end 50 thereof.

The first and second backing plate straps 52, 54 can be secured to the first and second set of attachment posts 60, 62 by any well-known process such as welding, brazing, fusing and the like. The insert 46, first and second backing plate straps 52, 54, and first and second sets of attachment posts 60, 62 can be formed from any well-known material including a polymeric, composite, or metal material and/or any combinations of these materials. According to one embodiment, the insert 46, first and second backing plate straps 52, 54, and first and second sets of attachment posts 60, 62 are formed from a metal material and the first and second backing plate straps 52, 54 are secured to the first and second set of attachment posts 60, 62 by welding.

A key bridge 64 can extend through an outwardly extending back portion 66 of the central portion 51 of the insert 46. This key bridge 64 is adapted for attachment to a vehicle brake head (not shown).

The central portion 51 of the insert 46 includes a front portion 68 extending in an outward direction with respect to an arc A-A defined by the first and second backing plate straps 52, 54. The first and second backing plate straps 52, 54 have a front face 52A, 54A and a back face 52B, 54B. The front faces 52A, 54A of the first and second backing plate straps 52, 54 and the front portion 68 of the insert 46 define a front face 70. This front face 70 is adapted for attachment with the friction material 42 by any well-known technique including molding the friction material directly onto the front face 70 or by the use of a separate binder/adhesive.

As shown in FIG. 6, the flange guide support 56 and side 58 of central portion 51 and insert 46 forms a U-shaped member. This U-shaped member is adapted for cooperating with a wheel flange (not shown) and aligning a center portion 72 of the brake shoe 40, as shown in FIGS. 4B and 7, against a vehicle wheel (not shown) during braking. The flange guide support 56 includes a pair of legs 74, 76 which, along with the side 58 of insert 46, define a channel 78. Leg 76 and channel 78 extend in a parallel direction with respect to a longitudinal axis L-L of the insert 46. When installed in a vehicle, leg 76 is positioned adjacent an outer rim of a vehicle wheel. The flange guide support 56 is positioned in the center of the backing plate 44 which reduces the tooling cost required to produce the brake shoe.

The universal brake shoe 40, as shown in FIG. 7, may be used within a trolley car braking system. The brake shoe includes a backing plate 44 having a front face 70 and a back face 71, as shown best in FIGS. 4A and 5. The backing plate 44 is discussed in detail above. The universal brake shoe 40 includes a key bridge 64 for attaching the brake shoe 40 with a brake head. The friction material 42 is associated with the front face 70 of the backing plate 44. This friction material 42 is adapted for contacting a vehicle wheel during braking. As shown in FIG. 7, the composition friction material 42 also covers flange guide support 56. The friction material 42 can be any well-known friction material. In one embodiment, the friction material 42 is a composition friction material and the backing plate including the insert is a metal. The composition friction material 42 may be integrally formed with the backing plate 44 or a separate attachment material; i.e., adhesive may be used to achieve this attachment.

The friction material 42 has a substantially uniform thickness and is substantially symmetrical in shape such that the brake shoe 40 is adapted for use on either a right hand or left hand side of the vehicle.

The use of the multi-functional insert 46 of the present invention provides a means to incorporate the insert into the brake shoe design as part of the backing plate assembly by utilizing the insert attachment posts 60, 62 to aid in permanently attaching the first and second backing plate straps 52, 54 for the purposes inherent to the structural support of the brake shoe 40, in addition to the performance aspects related to treatment and wear characteristics of the wheel to be used in conjunction with the brake shoe 40 to provide the braking function of the rail vehicle. Also, the specific design of the insert 46 allows the keyway or key bridge 64 and the wheel flange guide 56 features to be produced as part of the insert 46. This special insert design also allows the backing plate assembly 44, the insert 46, wheel flange guide 56 and keyway or key bridge 64 to be structurally supported together as installed in the vehicle and during brake applications, and assure structural integrity and proper alignment of the brake shoe 40 against the wheels during brake applications.

The inventive design uses the metal insert as part of the backing plate assembly that is molded as part of the composition brake shoe. The backing plate assembly design includes the welded attachment of the metal backing plate straps to the multi-functional insert 46 which is used as a means of support for the molded friction material 42. This underlying structure is thereby directly supported by contact with the brake head supporting lugs which align the backing plate key bridge 64 with the keyway of the brake head structure. The multi-functional insert 46 has been designed to combine the function of the metal friction insert and by adding extended portions from the underlying support for the flange guide geometry, a raised keyway portion 66 and extended fingers (attachment posts 60, 62) that provide support and means to attach the welded backing plate straps 52, 54.

The use of the composition brake shoe of the present invention has numerous advantages. One of these advantages is that its use will reduce the amount of cast iron metal residue contaminating the city streets to a level that should not require special cleaning. Another advantage of the invention is that the proposed brake shoe design utilizes a symmetrical shape and a uniform thickness of friction material resulting in a single brake shoe design which can be used for installation in all locations of the vehicle. Yet another advantage of the invention is that the proposed design of the brake shoe with the flange guide located at the center portion of the shoe instead of at the ends of the shoe, as with the designs currently in use, is that the tooling cost required to produce the brake shoe allows for a replacement composition brake shoe to be produced at a competitive price.

Although the invention has been described in detail for the purpose of illustration based on what is currently considered to be the most practical and preferred embodiments, it is to be understood that such detail is solely for that purpose and that the invention is not limited to the disclosed embodiments, but on the contrary, is intended to cover modifications and equivalent arrangements that are within the spirit and scope of this invention. For example, it is to be understood that the present invention contemplates that, to the extent possible, one or more features of any embodiment can be combined with one or more features of any other embodiment.

The invention claimed is:

1. A backing plate configured for use with a brake shoe comprising a layer of friction material defining a friction surface to contact a wheel, said backing plate comprising:
   (a) a single piece metal insert having a first end, a second end, and a central portion extending between said first end and said second end, said central portion formed to extend through said layer of friction material such that an end of said central portion lies in said friction surface of said layer of friction material for contact with a wheel tread upon wearing of said friction surface, said central portion of said insert includes a key bridge extending through a back portion thereof and configured for attachment to a vehicle brake head;
   (b) a first backing plate strap associated with said first end of said insert;
   (c) a second backing plate strap associated with said second end of said insert; and
   (d) a flange guide support connected to and extending from a side of said central portion of said insert.

2. The backing plate of claim 1 wherein said insert includes at least a first backing plate attachment post extending from said first end and adapted for attachment with said first backing plate strap.

3. The backing plate of claim 2 wherein said insert includes at least a second backing plate attachment post extending from said second end and adapted for attachment with said second backing plate strap.

4. The backing plate of claim 1 wherein said insert includes a first set of backing plate attachment posts extending from said first end and a second set of backing plate attachment posts extending from said second end, said first set of attachment posts adapted for attachment with said first backing plate strap and said second set of attachment posts adapted for attachment with said second backing plate strap.

5. The backing plate of claim 4 wherein said attachment of said first and second backing plate straps with said first and second sets of attachment posts occurs by welding, brazing or fusing.

6. The backing plate of claim 1 wherein said first and second backing plate straps are curved to form an arc and said central portion of said insert includes a front portion extending in an outward direction with respect to the arc defined by said first and second backing plate straps.

7. The backing plate of claim 6 wherein said first and second backing plate straps and said front portion of said insert define a front face and wherein said front face is adapted for attachment with a composition friction material.

8. The backing plate of claim 1 wherein said first backing plate strap, said second backing plate strap and said insert define a support member for supporting a composition friction material.

9. The backing plate of claim 1 wherein said flange guide support comprises a pair of legs defining a channel and wherein said pair of legs cooperate with the central portion of the insert to form a U-shaped member for contacting a wheel flange and aligning a center portion of the brake shoe against a vehicle wheel during braking.

10. The backing plate of claim 1 wherein said first backing plate strap, said second backing plate strap, and said insert are formed from metal.

11. A single piece metal insert for use in a backing plate assembly for a brake shoe comprising a layer of friction material defining a friction surface to contact a wheel, said insert comprising:
 (a) a central portion having a first end, second end, and side portions extending between said first end and said second end, said central portion formed to extend through said layer of friction material such that an end of said central portion lies in said friction surface of said layer of friction material for contact with a wheel tread upon wearing of said friction surface;
 (b) at least a first attachment post extending from said first end;
 (c) at least a second attachment post extending from said second end;
 (d) a key bridge extending through said first end, second end and central portion, and configured for attachment with a brake head; and
 (e) a flange guide support extending from one of said side portions.

12. The insert of claim 11 wherein said flange guide support cooperates with said one of said side portion to form a U-shaped member defining a channel, said channel extending in a parallel direction with respect to said central portion.

13. The insert of claim 11 wherein said at least a first attachment post comprises a first set of attachment posts adapted for attachment with a first backing plate strap and said at least a second attachment post comprises a second set of attachment posts adapted for attachment to a second backing plate strap.

14. The insert of claim 11 wherein said key bridge is configured for attachment to a vehicle brake head.

15. The insert of claim 11 wherein said central portion, said first and second attachment post and said flange member are formed from metal.

16. A universal brake shoe for use with a trolley car braking system, said brake shoe comprising:
 (a) a backing plate having a front face and a back face, said backing plate including a pair of backing plate straps;
 a single piece metal insert member positioned between and attached to said pair of backing plate straps, said insert member having a central portion and a flange guide support connected to said central portion and extending from a side of said central portion, said insert member having a key bridge extending through a back portion thereof and configured for attachment with a brake head; and
 (b) a friction material associated with said front face of said backing plate, said friction material adapted for contacting a vehicle wheel during braking; and
 wherein said central portion of said insert is formed to extend through said friction material such that an end of said central portion lies in a friction surface defined by said friction material for contact with a wheel tread upon wearing of said friction surface.

17. The universal brake shoe of claim 16 wherein said flange guide support is adapted for contacting a wheel flange and aligning a center portion of the brake shoe against the vehicle wheel during braking.

18. The universal brake shoe of claim 16 wherein the friction material has a substantially uniform thickness and is substantially symmetrical in shape such that said brake shoe is adapted for use on either a right hand or left hand side of the vehicle.

19. The universal brake shoe of claim 16 wherein said backing plate is formed from a metal material and said friction material is formed from a composition friction material.

\* \* \* \* \*